United States Patent
Ogawa

(10) Patent No.: US 6,937,281 B1
(45) Date of Patent: Aug. 30, 2005

(54) IMAGE PICKUP APPARATUS, METHOD AND COMPUTER PROGRAM PROCDUCT IN WHICH A DECISION TO FINISH A DISPLAYED IMAGE IS MADE AND/OR AND A KEPT DISPLAYED IMAGE IS PROCESSED

(75) Inventor: Yasuyuki Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 805 days.

(21) Appl. No.: 09/685,175

(22) Filed: Oct. 10, 2000

(30) Foreign Application Priority Data

Oct. 15, 1999 (JP) .......................................... 11-293564

(51) Int. Cl.⁷ ............................................. H04N 5/222
(52) U.S. Cl. ............................. 348/333.12; 348/333.11
(58) Field of Search ...................... 348/333.11, 333.12, 348/222.1, 333.01, 333.02; 396/374, 296

(56) References Cited

U.S. PATENT DOCUMENTS 6,359,649 B1 * 3/2002 Suzuki ..................... 348/220.1
6,441,854 B2 * 8/2002 Fellegara et al. ......... 348/333.13
6,549,307 B1 * 4/2003 Makishima et al. ... 348/333.11

FOREIGN PATENT DOCUMENTS

| JP | 07-093097 | 4/1995 |
|---|---|---|
| JP | 11-146317 | 5/1999 |

* cited by examiner

*Primary Examiner*—Tuan Ho
*Assistant Examiner*—Heather R. Long
(74) *Attorney, Agent, or Firm*—Cowan, Liebowitz & Latman, P.C.

(57) ABSTRACT

In an image pickup apparatus, a control method adapted for the image pickup apparatus, and a computer program product supplying a control program adapted for the image pickup apparatus, a photo-taken image obtained by a photo-taking operation is displayed in response to the photo-taking operation, and whether displaying of the photo-taken image displayed in response to the photo-taking operation is to be kept even after an operation of a photo-taking starting operation member for giving an instruction for starting photo-taking is canceled is decided.

32 Claims, 3 Drawing Sheets

IMAGE PICKUP APPARATUS, METHOD AND COMPUTER PROGRAM PROCDUCT IN WHICH A DECISION TO FINISH A DISPLAYED IMAGE IS MADE AND/OR AND A KEPT DISPLAYED IMAGE IS PROCESSED

BACKGROUND OF THE INVENTION

1. Field of the Invention

The present invention relates to an image pickup apparatus for picking up a still image or a moving image, a control method adapted for the image pickup apparatus, and a computer program product supplying a control program adapted for the image pickup apparatus.

2. Description of Related Art

Heretofore, there has been known an image pickup apparatus, such as an electronic camera, which picks up an object image to obtain a picked-up image, such as a still image or a moving image, and stores or reproduces the picked-up image. Such an image pickup apparatus is provided with a display part, such as an electronic viewfinder, composed of a color liquid crystal panel or the like, and is arranged to allow a recording medium, such as a memory card having a solid-state memory element, to be detachably attached thereto. Then, the image pickup apparatus is able to store a picked-up image in the recording medium, and is also able to reproduce and display the stored picked-up image at the display part immediately after an image pickup operation for the picked-up image, thereby making it possible for the user to swiftly confirm the picked-up image as reproduced.

However, the above-mentioned conventional image pickup apparatus is arranged such that, in a case where a picked-up image is to be reproduced and displayed immediately after an image pickup operation for the picked-up image, the picked-up image is reproduced and displayed for a predetermined period of time automatically after the image pickup operation, or the picked-up image is reproduced and displayed for a period of time during which a release switch continues being depressed. Therefore, the state of displaying the picked-up image is not kept for a desired period of time, so that, in some cases, it is impossible to sufficiently confirm the content of the displayed picked-up image. Accordingly, in order to confirm the displayed picked-up image in detail, it is necessary to temporarily change the mode of the image pickup apparatus from a photo-taking mode to a reproduction mode and to confirm the picked-up image with the image pickup apparatus set in the reproduction mode.

BRIEF SUMMARY OF THE INVENTION

In accordance with an aspect of the invention, there are provided an image pickup apparatus, a control method adapted for the image pickup apparatus, and a computer program product supplying a control program adapted for the image pickup apparatus, in which a photo-taken image obtained by a photo-taking operation is displayed in response to the photo-taking operation, and whether displaying of the photo-taken image displayed in response to the photo-taking operation is to be kept even after an operation of a photo-taking starting operation member for giving an instruction for starting photo-taking is canceled is decided, so that it is possible to improve the operability of confirmation, processing, etc., of the photo-taken image after the photo-taking operation.

In accordance with another aspect of the invention, there are provided an image pickup apparatus, a control method adapted for the image pickup apparatus, and a computer program product supplying a control program adapted for the image pickup apparatus, in which a photo-taken image obtained by a photo-taking operation is displayed in response to the photo-taking operation, whether displaying of the photo-taken image displayed in response to the photo-taking operation is to be kept is decided, and, in a state where displaying of the photo-taken image is kept, a predetermined processing operation is applied to the photo-taken image the displaying of which is kept, so that it is possible to improve the operability of confirmation, processing, etc., of the photo-taken image after the photo-taking operation.

In accordance with a further aspect of the invention, there are provided an image pickup apparatus, a control method adapted for the image pickup apparatus, and a computer program product supplying a control program adapted for the image pickup apparatus, in which a photo-taken image obtained by a photo-taking operation is displayed in response to the photo-taking operation, displaying of the photo-taken image is kept, and, in a state where displaying of the photo-taken image is kept, a predetermined processing operation is applied to the photo-taken image the displaying of which is kept, so that it is possible to improve the operability of confirmation, processing, etc., of the photo-taken image after the photo-taking operation.

The above and further aspects of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
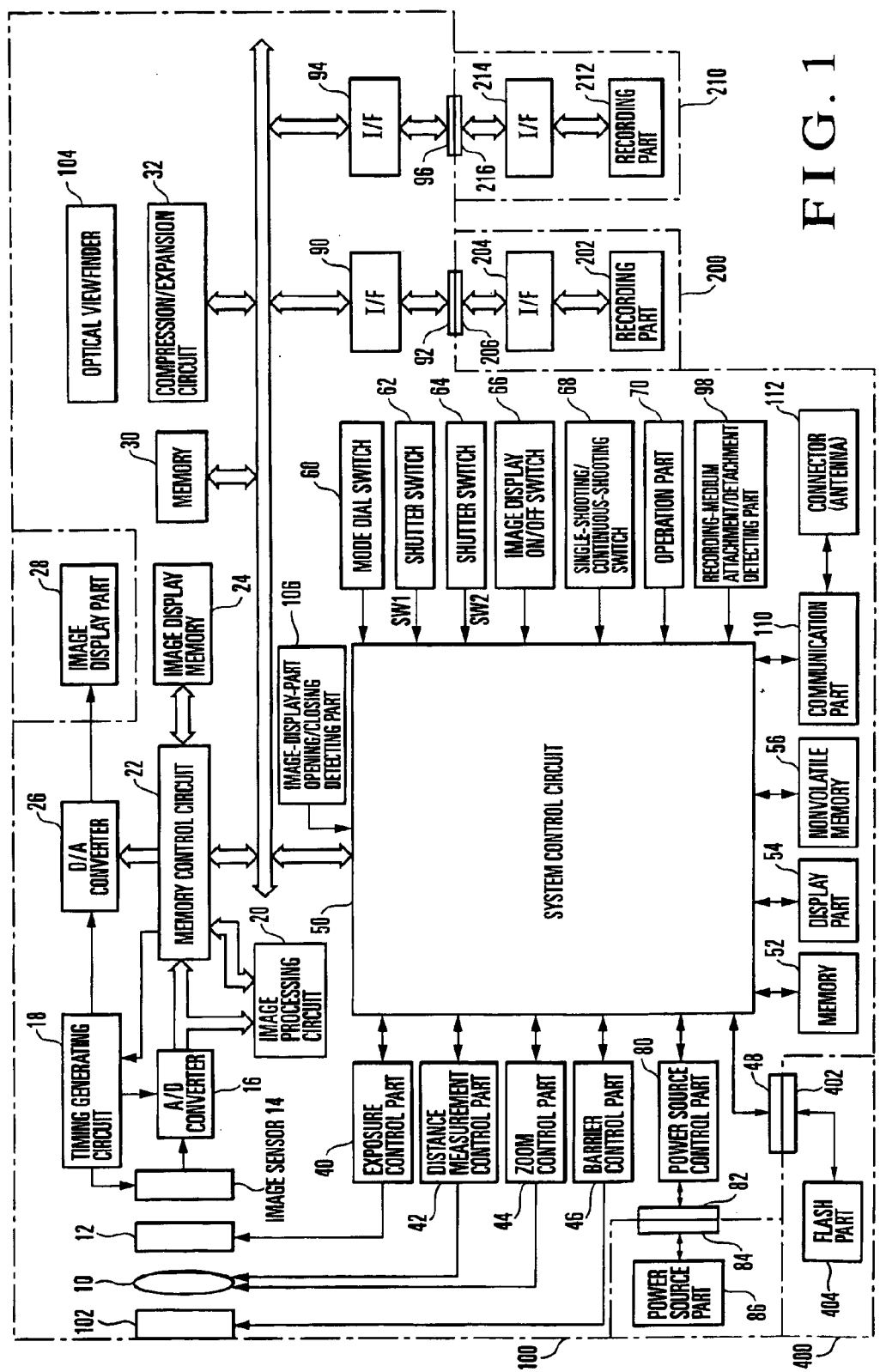
FIG. 1 is a block diagram showing the arrangement of an image processing apparatus, serving as an image pickup apparatus, according to an embodiment of the invention.

FIG. 1 is a block diagram showing the arrangement of an image processing apparatus, serving as an image pickup apparatus, according to an embodiment of the invention. The image processing apparatus shown in FIG. 1 is constructed as an electronic camera.

Referring to FIG. 1, the image processing apparatus, which is denoted by reference numeral 100, includes a photo-taking lens 10, a shutter 12 having the diaphragm function, and an image sensor 14 for converting an optical image into an electrical signal. An A/D converter 16 converts an analog signal output of the image sensor 14 into a digital signal. A timing generating circuit 18 supplies a clock signal, a control signal or the like to the image sensor 14, the A/D converter 16, etc., and is controlled by a memory control circuit 22 and a system control circuit 50.

An image processing circuit 20 performs a predetermined pixel interpolating processing operation, a predetermined color conversion processing operation, etc., onto data supplied from the A/D converter 16 or data supplied from the memory control circuit 22. Further, the image processing circuit 20 performs a predetermined computing processing operation using image data obtained by an image pickup operation. On the basis of a result of the predetermined computing processing operation, the system control circuit 50 performs an AF (automatic focusing) processing operation and an AE (automatic exposure) processing operation of the TTL (through-the-lens) type for controlling a distance measurement control part 42 and an exposure control part 40, and an EF (preliminary flash emission in electronic flash) processing operation. Furthermore, the image processing circuit 20 performs another predetermined processing operation using image data obtained by the image pickup operation, and, on the basis of a result of the predetermined processing operation, an AWB (automatic white balance) processing operation of the TTL type is performed.

The memory control circuit 22 controls the A/D converter 16, the timing generating circuit 18, the image processing circuit 20, an image display memory 24, a D/A converter 26, a memory 30 and a compression/expansion circuit 32.

Data outputted from the A/D converter 16 is written, through both the image processing circuit 20 and the memory control circuit 22 or through the memory control circuit 22 only, into the image display memory 24 or the memory 30.

An image display part 28 is composed of a TFT-LCD (thin-film transistor liquid crystal display) or the like. Image data for display written in the image display memory 24 is supplied, through the D/A converter 26, to the image display part 28 and is then displayed at the image display part 28. If image data obtained by the image pickup operation is made to be successively displayed at the image display part 28, it is possible to realize the electronic viewfinder function. Further, the image display part 28 is able to turn on and off the displaying operation thereof arbitrarily in response to an instruction from the system control circuit 50. If the displaying operation is turned off, the consumption of electric power of the image processing apparatus 100 can be reduced greatly. In addition, the image display part 28 is coupled to the body of the image processing apparatus 100 by a rotatable hinge part (not shown), so that, with the direction and angle of the image display part 28 freely set, it is possible to use the electronic viewfinder function, the reproduction displaying function, the various displaying function, etc. Furthermore, the image display part 28 can be stowed with a display portion (display surface) thereof facing the body of the image processing apparatus 100. If the image display part 28 has been stowed, the stowage state (opening/closing state) of the image display part 28 is detected by an image-display-part opening/closing detecting part 106, so that it is possible to stop the displaying operation of the image display part 28.

The memory 30 is arranged to store a still image or a moving image and sound data obtained by the image pickup operation, and has a sufficient storage capacity for storing a predetermined number of still images or a moving image running for a predetermined time. Accordingly, even in the case of a continuous-shooting photo-taking operation in which a plurality of still images are continuously picked up or even in the case of a panorama photo-taking operation, a high-speed and large-volume image writing action can be performed onto the memory 30. Further, the memory 30 can be used as a working area for the system control circuit 50.

The compression/expansion circuit 32, which compresses or expands image data by using the adaptive discrete cosine transform (ADCT) or the like, reads image data stored in the memory 30, performs compression processing or expansion processing on the image data, and then writes the processed image data into the memory 30.

The exposure control part 40, which controls the shutter 12, has the flash light adjusting function associated with a flash part 404. The distance measurement control part 42 controls the focusing of the photo-taking lens 10. The exposure control part 40 and the distance measurement control part 42 are controlled by using the TTL method. Thus, on the basis of a result of computation obtained by computing the picked-up image data with the image processing circuit 20, the system control circuit 50 controls the exposure control part 40 and the distance measurement control part 42.

A zoom control part 44 controls the zooming of the photo-taking lens 10. A barrier control part 46 controls the action of a protection member 102 serving as a barrier. A connector 48, which is called also as an accessory shoe, is provided with an electrical contact and a mechanical fixing means to be connected with a flash device 400.

The system control circuit 50 controls the whole image processing apparatus 100. A memory 52 stores constants, variables, programs, etc., to be used for the action of the system control circuit 50.

A display part 54, which is composed of a liquid crystal display device, a speaker, etc., displays the operating state, a message, etc., by using characters, images, sound, etc., according to the execution of a program in the system control circuit 50. The display part 54 is disposed at a single portion or at a plurality of portions in such a position as to be easy to view in the vicinity of an operation part of the image processing apparatus 100, and is composed of a combination of an LCD (liquid crystal display device), an LED (light emitting diode), a sound producing element, etc., for example. Further, the display part 54 has a part of its functions disposed inside an optical viewfinder 104. Among display contents of the display part 54, the ones which are to be displayed on the LCD, etc., include a single-shooting/continuous-shooting photo-taking display, a self-timer display, a compression rate display, a number-of-recording-pixels display, a number-of-recording-images display, a number-of-remaining-recordable-images display, a shutter speed display, an aperture value display, an exposure compensation display, a flash display, a red-eye prevention display, a macro photography display, a buzzer setting display, a remaining-amount-of-battery-for-clock display, a remaining-amount-of-battery-for-camera display, an error display, an information display with a plurality of digits, an attachment/detachment state display for a recording medium 200 and a recording medium 210, a communication I/F (interface) operation display, a date-and-time display, a sound recording operation display, etc.

Further, among the display contents of the display part 54, the ones which are to be displayed inside the optical viewfinder 104 include an in-focus display, a camera-shake warning display, a flash charging display, a shutter speed display, an aperture value display, an exposure compensation display, etc.

A nonvolatile memory 56, which is electrically erasable and recordable, is composed of an EEPROM (electrically erasable and programmable read-only memory) or the like. Operation means 60, 62, 64, 66, 68 and 70 are arranged to input the various operation instruction signals to the system control circuit 50, and are composed of a combination of one or a plurality of ones of a switch, a touch panel, a pointing device using visual-line detection, a speech recognition device, etc.

Here, each of the operation means 60, 62, 64, 66, 68 and 70 will be particularized.

The operation means 60 is a mode dial switch, which is capable of setting and changing the various function modes, such as photo-taking modes including an automatic photo-taking mode, a manual photo-taking mode, a panorama photo-taking mode, etc., a reproduction mode, a multiple-picture reproduction and erasure mode, a PC connection mode, etc., in addition to a power-off mode.

The operation means 62 is a shutter switch (SW1), which is arranged to be turned on by the halfway operation of a shutter button (not shown) to give an instruction for starting operations including an AF (automatic focusing) processing operation, an AE (automatic exposure) processing operation, an AWB (automatic white balance) processing operation, an EF (preliminary flash emission in electronic flash) processing operation, etc.

The operation means 64 is a shutter switch (SW2), which is arranged to be turned on by the complete operation of the shutter button (not shown) to give an instruction for starting a series of operations including an exposure processing operation for writing an image signal read out of the image sensor 12 into the memory 30 through the A/D converter 16 and the memory control circuit 22, a developing processing operation using the computing operation of the image processing circuit 20 or the memory control circuit 22, and a recording processing operation for reading image data out of the memory 30, compressing the image data at the compression/expansion circuit 32, and writing the processed image data into the recording medium 200 or the recording medium 210.

The operation means 66 is an image display ON/OFF switch, which is arranged to set the turning-on or turning-off of the image display part 28. According to the function of the image display ON/OFF switch 66, when a photo-taking operation is performed with the optical viewfinder 104 used, it is possible to save the power consumption of the image processing apparatus 100 by cutting off the supply of electric current to the image display part 28, which is composed of a TTL-LCD or the like.

The operation means 68 is a single-shooting/continuous-shooting switch, which is arranged to set a single shooting mode in which, when the shutter switch (SW2) 64 is depressed, a single frame is exposed and the image processing apparatus 100 then comes into a standby state, or a continuous shooting mode in which a plurality of frames are successively exposed for a period of time during which the shutter switch (SW2) 64 continues being depressed.

The operation means 70 is an operation part, which is composed of the various buttons, a touch panel, etc., including a menu button, a setting button, a macro button, a multiple-picture reproduction page-break button, a flash setting button, a single-shooting/continuous-shooting self-timer changeover button, a menu shift + (plus) button, a menu shift (minus) button, a reproduced image shift + (plus) button, a reproduced image − (minus) button, a menu shift up button, a menu shift down button, a photo-taking image-quality selection button, an exposure compensation button, a data/time setting button, a selection/changeover button for setting the selection and changeover of the various functions when a photo-taking operation in the panorama mode or the like and a reproducing operation are performed, a decision/execution button for setting the decision and execution of the various functions when the photo-taking operation in the panorama mode or the like and the reproducing operation are performed, a quick-review ON/OFF switch for setting a quick-review function in which photo-taken image data is automatically reproduced immediately after the photo-taking operation, a compression mode switch for selecting the compression rate of JPEG compression or for selecting a CCDRAW mode in which an image signal outputted from the image sensor 14 is digitized, without being processed, to be recorded in the recording medium 200 or the recording medium 210, a reproduction mode switch for setting the various function modes including the reproduction mode, the multiple-picture reproduction and erasure mode and the PC connection mode, a reproduction switch for giving an instruction for starting a reproducing operation, with the image processing apparatus 100 kept in the photo-taking mode, to read a photo-taken image out of the memory 30 or the recording medium 200 or 210 and to display the read-out image at the image display part 28, a drive button for changing active drives, a reproduction display changeover button for changeover between a single-image display and a multiple-image display during the reproducing operation, an information display button for displaying additional information of a recorded image, etc.

A power source control part 80 is composed of a battery detecting circuit, a DC—DC converter, a switch circuit for changing blocks to be energized, and is arranged to detect the attachment or detachment of a battery, the kind of a battery and the remaining amount of a battery, to control the DC—DC converter on the basis of results of the detection and an instruction from the system control circuit 50, and to supply, to the various parts including the recording medium 200 or 210, necessary voltages for necessary periods of time.

The power source control part 80 is provided with a connector 82, which is arranged to be connected with a connector 84 of a power source part 86. The power source part 86 is composed of a primary battery, such as an alkaline battery or a lithium battery, a secondary battery, such as an NiCd battery, an NiMH battery or Li battery, an AC adapter, or the like.

The image processing apparatus 100 is provided with interfaces 90 and 94 to be associated with the recording media 200 and 210, each of which is composed of a memory card, a hard disk or the like, and connectors 92 and 96 to be connected with the recording media 200 and 210.

A recording-medium attachment/detachment detecting part 98 is arranged to detect whether the recording medium 200 and/or the recording medium 210 is attached to the connector 92 and/or the connector 96.

Incidentally, in the present embodiment, the image processing apparatus 100 is provided with two channels of interfaces and connectors for the attachment of recording media. However, the image processing apparatus 100 may be provided with one channel of interface and connector or a plurality of channels of interfaces and connectors. Further, interfaces and connectors of different standards may be provided in combination.

The interfaces and connectors may be the ones conforming to the standards of a PCMCIA card, a CF (compact flash) card or the like. Further, if the interfaces 90 and 94 and the connectors 92 and 96 are composed of the ones conforming to the standards of a PCMCIA card, a CF (compact flash) card or the like, when any one of the various communication cards including a LAN card, a modem card, a USB card, an IEEE1394 card, a P1284 card, an SCSI card, a PHS card, etc., is connected thereto, it is possible to transfer image data and management information annexed to the image data between the image processing apparatus 100 and a peripheral apparatus, such as a computer or a printer.

The protection member 102, which serves as a barrier, is arranged to cover an image pickup part including the photo-taking lens 10 of the image processing apparatus 100, thereby preventing dirt or breakage of the image pickup part. The optical viewfinder 104 makes it possible to perform a photo-taking operation with the optical viewfinder 104 only used without using the electronic viewfinder function of the image display part 28. Further, inside the optical viewfinder 104, there are disposed some of the functions of the display part 54, i.e., the in-focus display function, the camera-shake warning display function, the flash charging display function, the shutter speed display function, the aperture value display function, the exposure compensation display function, etc.

The image-display-part opening/closing detecting part 106 is arranged to detect whether the image display part 28 is in such a stowage state that the image display part 28 is stowed with the display part (display surface) thereof facing the body of the image processing apparatus 100. If the image-display-part opening/closing detecting part 106 has detected that the image display part 28 is in the stowage state, the displaying operation of the image display part 28 is brought to a stop, so that it is possible to prevent the unnecessary consumption of electric power.

A communication part 110 has the various communication functions including RS232C, USB, IEEE1394, P1284, SCSI, modem, LAN, wireless communication, etc. A connector or antenna 112 is used when the image processing apparatus 100 is connected to another apparatus or when wireless communication is performed.

The recording medium 200, which is composed of a memory card, a hard disk or the like, is provided with a recording part 202 composed of a semiconductor memory, a magnetic disk or the like, an interface (I/F) 204 used for communication with the image processing apparatus 100, and a connector 206 used for connection with the image processing apparatus 100.

The recording medium 210, which is composed of a memory card, a hard disk or the like, is provided with a recording part 212 composed of a semiconductor memory, a magnetic disk or the like, an interface (I/F) 214 used for communication with the image processing apparatus 100, and a connector 216 used for connection with the image processing apparatus 100.

The flash device 400 is provided with a connector 402 arranged to be connected to the accessory shoe of the image processing apparatus 100. The flash part 404, which is included in the flash device 400, has the function of projecting AF auxiliary light and the function of adjusting flash emission.

With the above-described construction adopted in the image processing apparatus 100, when the image processing apparatus 100 is set to the photo-taking mode by the operation of the mode dial switch 60, a photo-taking operation can be performed by operating the shutter switch (SW1) 62 and the shutter switch (SW2) 64. The system control circuit 50 is normally in the photo-taking preparing state. When the depression of the shutter switch (SW1) 62 is detected, an exposure control operation is performed by the exposure control part 40, and, at the same time, a distance measurement control operation is performed by the distance measurement control part 42. At a point of time when these control operations have been completed, the state of the image processing apparatus 100 is shifted to an exposure starting state. Then, in the exposure starting state, when the depression of the shutter switch (SW2) 64 is detected, an exposure operation is started. A picked-up image signal obtained by the exposure operation is stored in the memory 30 through the image sensor 14, the A/D converter 16, the image processing circuit 20 and the memory control circuit 22. The image signal stored in the memory 30 is subjected to data compression by the compression/expansion circuit 32, according to necessity, and is stored again in the memory 30. In such a state, the system control circuit 50 is brought into a photo-taking completion state.

Figure 2:
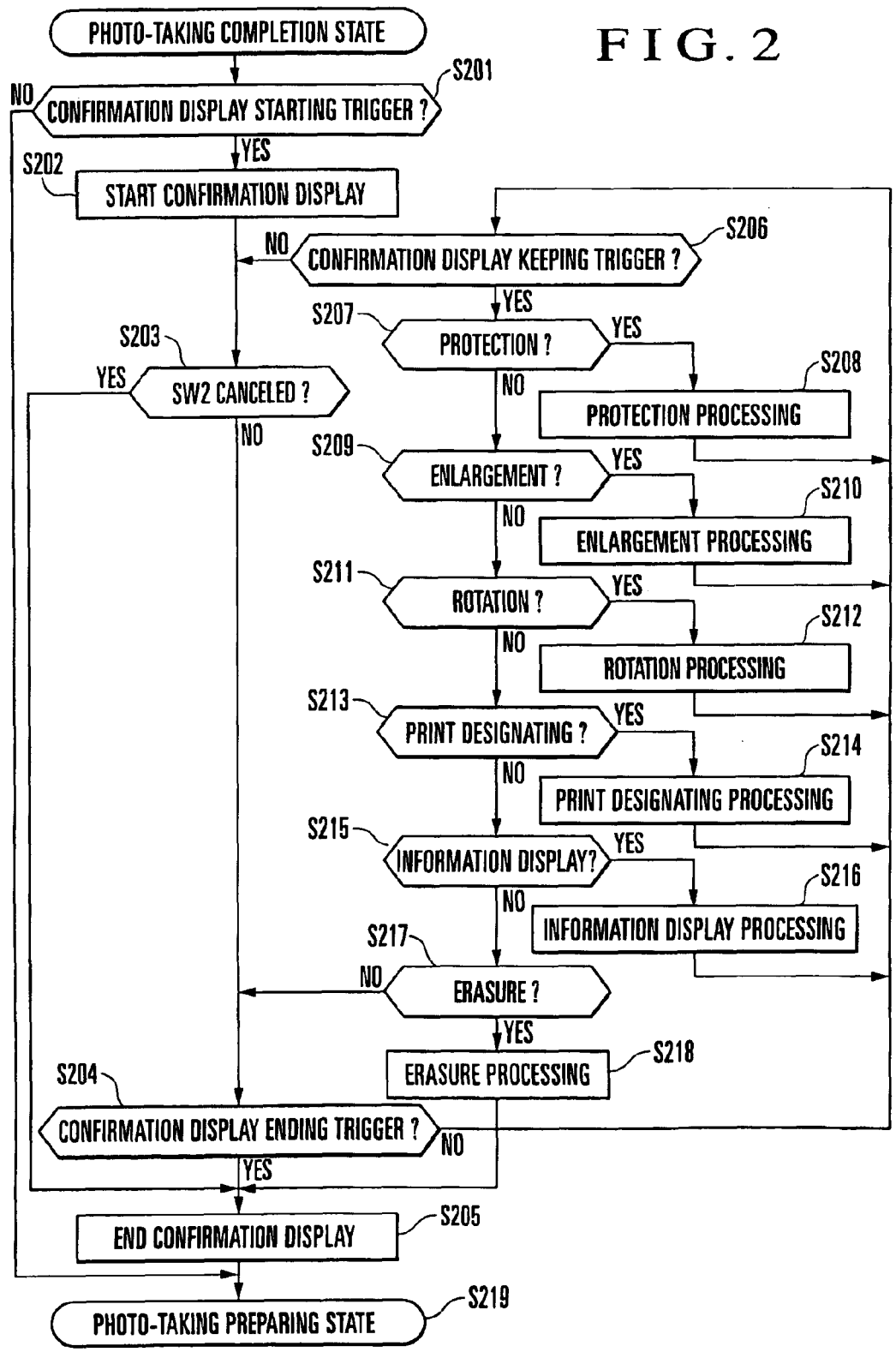
FIG. 2 is a flow chart showing a confirmation display processing operation in the image processing apparatus according to the embodiment shown in FIG. 1.

FIG. 2 is a flow chart showing a confirmation display processing operation in the image processing apparatus according to the embodiment shown in FIG. 1. The confirmation display processing operation is started in response to the system control circuit 50 coming into the above-mentioned photo-taking completion state in the photo-taking mode.

Referring to FIG. 2, first, a check is made to find if a confirmation display starting trigger has occurred (step S201). Here, the confirmation display starting trigger occurs for the purpose of making a confirmation display, i.e., displaying a picked-up image immediately after a photo-taking operation for the picked-up image, with the photo-taking mode kept (without changing to the reproduction mode). For example, a point of time when the system control circuit 50 has come into the photo-taking completion state is memorized, and, when the shutter switch (SW2) 64 is in the state of being depressed a predetermined period of time (for example, several seconds) after the point of time memorized, the confirmation display starting trigger occurs. Accordingly, the user can make the confirmation display starting trigger occur by continuing depressing the shutter switch (SW2) 64 for a predetermined period of time after the photo-taking operation. In the present embodiment, the confirmation display of a picked-up image is made at the image display part 28.

If it is found, as a result of the check made in the above step S201, that the confirmation display starting trigger has not occurred, the procedure proceeds immediately to step S219, where the system control circuit 50 returns to the photo-taking preparing state. In the photo-taking preparing state, when the picked-up image data is left over in the memory 30 and the recording medium 200 or 210 being attached to the connector 92 or 96 is detected on the basis of a signal from the recording-medium attachment/detachment detecting part 98, the system control circuit 50 records, in the recording medium 200 or 210, the picked-up image data stored in the memory 30, and then clears the picked-up image data from the memory 30.

On the other hand, if it is found, as a result of the check made in the above step S201, that the confirmation display starting trigger has occurred, the procedure proceeds to step S202, where a confirmation display starting process is performed. Thus, in the confirmation display starting process, the picked-up image data obtained by the current photo-taking operation and stored in the memory 30 is subjected to data expansion by the compression/expansion circuit 32, and the expanded image data is stored, as data for display, in the image display memory 24 through the memory control circuit 22. Then, the image data stored in the image display memory 24 is displayed at the image display part 28 by the system control circuit 50.

Next, a check is made to find if the depression of the shutter switch (SW2) 64 has been canceled (step S203). If so, the procedure proceeds to step S205, where a video output of the picked-up image data to the image display part 28 is brought to a stop. On the other hand, if the depression of the shutter switch (SW2) 64 has not been canceled, the procedure proceeds to step S204, where a check is made to find if a confirmation display ending trigger has occurred. Here, the confirmation display ending trigger occurs for the purpose of ending a confirmation display of the picked-up image. For example, the confirmation display ending trigger occurs when the shutter switch (SW1) 62 has been depressed.

If it is found, as a result of the check made in the above step S204, that the confirmation display ending trigger has occurred, the procedure proceeds to step S205, where a confirmation display ending process is performed. Thus, a video output of the picked-up image data to the image display part 28 is brought to a stop, and the procedure returns to the photo-taking preparing state (step S219).

On the other hand, if it is found, as a result of the check made in the above step S204, that the confirmation display ending trigger has not occurred, the procedure proceeds to step S206, where a check is made to find if a confirmation display keeping trigger has occurred. Here, the confirmation display keeping trigger occurs for the purpose of causing a confirmation display of the picked-up image to continue, so as to give the user the opportunity of applying the various processing operations to the picked-up image as will be described later. For example, the confirmation display keeping trigger occurs when the setting button of the operation part 70 has been depressed.

If it is found, as a result of the check made in the above step S206, that the confirmation display keeping trigger has not occurred, the procedure proceeds to the step S203. Accordingly, the confirmation display continues until the depression of the shutter switch (SW2) 64 is canceled or until the confirmation display ending trigger occurs.

On the other hand, if it is found, as a result of the check made in the above step S206, that the confirmation display keeping trigger has occurred, the procedure proceeds to steps S207 to S218, where the discrimination of occurrence of triggers for processes concerning the picked-up image and the processing operations corresponding to the respective triggers are effected. The triggers for the various processing operations are made to occur by the inputting operation of the user.

First, a check is made to find if a protection setting trigger has occurred (step S207). If it is found, as a result of the check made in the step S207, that the protection setting trigger has occurred, the procedure proceeds to step S208, where a protection process is performed. Thus, when the protection setting trigger for the first time has occurred, protection data for preventing erroneous erasure is set with respect to data stored in the memory 30 or the recording medium 200 or 210, and, at the same time, the contents of setting of the protection data are displayed at the image display part 28 together with the picked-up image in an overlapping manner. After that, the procedure returns to the above step S206.

Incidentally, in such a state that the protection setting has been made once, if it is found, as a result of the check made in the step S207, that the protection setting trigger has occurred again, the process of canceling the protection setting is performed in the next step S208, and the contents of that setting are outputted to the image display part 28. After that, the procedure returns to the step S206.

On the other hand, if it is found, as a result of the check made in the step S207, that the protection setting trigger has not occurred, the procedure proceeds to step S209, where a check is made to find if an enlargement display trigger has occurred. If it is found, as a result of the check made in the step S209, that the enlargement display trigger has occurred, the procedure proceeds to step S210, where an enlargement process is performed. Thus, display data stored in the image display memory 24 is subjected to the enlargement process by using the memory control circuit 22 and the image processing circuit 20, and the processed display data is stored again in the image display memory 24. Then, an enlarged reproduction display of the display data is performed at the image display part 28. Incidentally, during the enlarged reproduction display, the position of an enlarged display can be changed by using the plus button, the minus button, the up button or the down button of the operation part 70. Further, if, in this instance, information indicative of the position of the current display is displayed at the image display part 28 in an overlapping manner together with the enlarged image, it is possible to make the user grasp the position of the currently-displayed image in the whole image. After that, the procedure returns to the step S206.

Incidentally, if, during the enlarged reproduction display, it is found, as a result of the check made in the step S209, that the enlargement display trigger has occurred again, in the next step S210, the output to the image display part 28 is changed from the mode of the enlarged reproduction display to the mode of the normal reproduction display. Then, the procedure returns to the step S206. Further, the image reducing process may be made possible by the processing operation similar to the above operation.

If it is found, as a result of the check made in the step S209, that the enlargement display trigger has not occurred, the procedure proceeds to step S211, where a check is made to find if a rotation setting trigger has occurred. The rotation setting trigger occurs for the purpose of rotating a picked-up image and displaying the rotated picked-up image. For example, the rotation setting trigger occurs so as to cause an image picked up in the vertical posture to be displayed in the vertical posture at the image display part 28.

If it is found, as a result of the check made in the step S211, that the rotation setting trigger has occurred, the procedure proceeds to step S212, where a rotation process is performed. Thus, recorded data stored in the memory 30 or the recording medium 200 or 210 is expanded by the compression/expansion circuit 32, and the expanded data is subjected to the rotation process for 90° rotation by using the memory control circuit 22 and the image processing circuit 20. After that, the processed data is stored again in the image display memory 24, and is then outputted to the image display part 28 so as to be displayed in the rotated state. At the same time, the recorded data stored in the memory 30 or the recording medium 200 or 210 is subjected to a setting process indicative of a rotation property. After that, the procedure returns to the step S206. The rotation property as set is reflected on an image to be reproduced during the reproduction mode. Further, even in a case where recorded data is transferred to another image processing apparatus through the communication part 110, it becomes possible to automatically reproduce the rotated image by making reference to the above rotation property at such another image processing apparatus.

Incidentally, if, during the process of the rotation display, it is found, as a result of the check made in the step S211, that the rotation setting trigger has occurred again, in the next step S212, the rotation angle is changed further by 90°. Then, the procedure returns to the step S206. Accordingly, the rotation angle is repeatedly changed every time the rotation setting trigger occurs.

On the other hand, if it is found, as a result of the check made in the step S211, that the rotation setting trigger has not occurred, the procedure proceeds to step S213, where a check is made to find if a print designating setting trigger has occurred. The print designating setting trigger occurs for the purpose of automatically printing image data according to a print setting operation when the recording medium 200 or 210 is mounted on a printer system (not shown), by forming a file for designation of prints in the recording medium 200 or 210 and setting forth, in the file, a link relationship between the file and an image file.

If it is found, as a result of the check made in the step S213, that the print designating setting trigger has occurred, the procedure proceeds to step S214, where a print designating process is performed. Thus, in a predetermined file in the recording medium 200 or 210, a link relationship between the predetermined file and a file of a picked-up image as currently displayed is additionally set forth, and a display indicative of the print designating state is displayed at the image display part 28 in an overlapping manner with the picked-up image. After that, the procedure returns to the step S206.

Incidentally, if, during the process of a display indicative of the print designating state, it is found, as a result of the check made in the step S213, that the print designating setting trigger has occurred again, in the next step S214, the print designating setting is canceled, i.e., the description of the link relationship is deleted from the file. Then, the procedure returns to the step S206.

On the other hand, if it is found, as a result of the check made in the step S213, that the print designating setting trigger has not occurred, the procedure proceeds to step S215, where a check is made to find if an information display setting trigger has occurred. If it is found, as a result of the check made in the step S215, that the information display setting trigger has occurred, the procedure proceeds to step S216, where an information display process is performed. Thus, at the image display part 28, information on photo-taking conditions of a picked-up image is displayed in an overlapping manner together with the picked-up image. After that, the procedure returns to the step S206. The information on photo-taking conditions includes, for example, information on the position of the mode dial at the time of a photo-taking operation, information on a Tv (shutter speed) value, an Av (aperture) value and an Ev (exposure) value, etc. When a picked-up image is stored in the memory 30 or the recording medium 200 or 210, the information on photo-taking conditions is stored therein in correspondence with the picked-up image.

Incidentally, if, during the process of displaying the information on photo-taking conditions, it is found, as a result of the check made in the step S215, that the information display setting trigger has occurred again, in the next step S216, the display of the information on photo-taking conditions is erased. Then, the procedure returns to the step S206.

On the other hand, if it is found, as a result of the check made in the step S215, that the information display setting trigger has not occurred, the procedure proceeds to step S217, where a check is made to find if an erasure trigger has occurred. If it is found, as a result of the check made in the step S217, that the erasure trigger has occurred, the procedure proceeds to step S218, where an erasure process is performed. Thus, a recorded picked-up image stored in the memory 30 or the recording medium 200 or 210 is erased. Subsequently, the procedure proceeds to the step S205, where the confirmation display ending process is executed. Then, the procedure proceeds to the photo-taking completion state (step S219).

On the other hand, if it is found, as a result of the check made in the step S217, that the erasure trigger has not occurred, the procedure proceeds to the step S204.

According to the present embodiment, if, after a photo-taking operation, the confirmation display starting trigger is made to occur by continuing depressing the shutter switch (SW2) 64 for a predetermined period of time, a picked-up image just obtained by the photo-taking operation is displayed with the photo-taking mode kept, during a period until the confirmation display ending trigger is made to occur by depressing the shutter switch (SW1) 62 after the occurrence of the confirmation display starting trigger, or until the depression of the shutter switch (SW2) 64 is canceled after the occurrence of the confirmation display starting trigger. Accordingly, it is possible to sufficiently confirm the picked-up image without performing any troublesome operation, such as changing to the reproduction mode.

Further, with respect to the erasure process, it is possible to surely erase an unnecessary picked-up image while confirming the display thereof. In addition, with respect to the protection process, it is possible to prevent any erroneous erasure of a picked-up image.

Further, if, during the process of the confirmation display, the confirmation display keeping trigger is made to occur by depressing the setting button of the operation part 70, then, the various processing operations, such as the protection process, become possible during a period until the confirmation display ending trigger is made to occur. Accordingly, it is possible to display a picked-up image with the photo-taking mode kept and apply the various processing operations to the picked-up image while preventing any unnecessary processing operation due to an erroneous operation or the like. Besides, since the processing operations applied to the picked-up image are reflected on the confirmation display, it is possible to confirm the processing operations at any time. Further, with respect to the rotation process, since the setting indicative of a rotation property is applied also to recorded data stored in the recording medium 200 or the like, it is possible, during the reproduction mode, to reproduce the picked-up image with the rotation process applied thereto. Therefore, it is possible to increase the operability of the image processing apparatus 100 in various manners.

Further, with respect to the print designating process, since a link relationship with an image file is set forth, it is possible to automatically print a recorded image stored in the recording medium 200 or the like according to the setting associated with the link relationship. Thus, it is possible to smoothly perform the processing operation at the time of printing-out.

Incidentally, with respect to the enlargement or reduction process or the information display process, also, similarly to the case of the rotation process, a property indicative of the enlargement or reduction process or the information display process may be applied to recorded data stored in the memory 30 or the recording medium 200 or 210, so that the enlargement or reduction process or the information display process can be reflected on a reproduced image.

Incidentally, the processing operations to be applied to a picked-up image during the confirmation display are not limited to the above-mentioned protection process, etc., but may be other processes.

Further, according to the above-described embodiment, the confirmation display starting trigger occurs when the shutter switch (SW2) 64 is in the state of being depressed a predetermined period of time after a point of time when the system control circuit 50 has come into the photo-taking completion state, the confirmation display ending trigger occurs when the shutter switch (SW1) 62 has been depressed, and the confirmation display keeping trigger occurs when the setting button of the operation part 70 has been depressed. However, the invention is not limited to such an arrangement. For example, these triggers may be made to occur on the basis of the predefined setting in the following manner.

Figure 3:
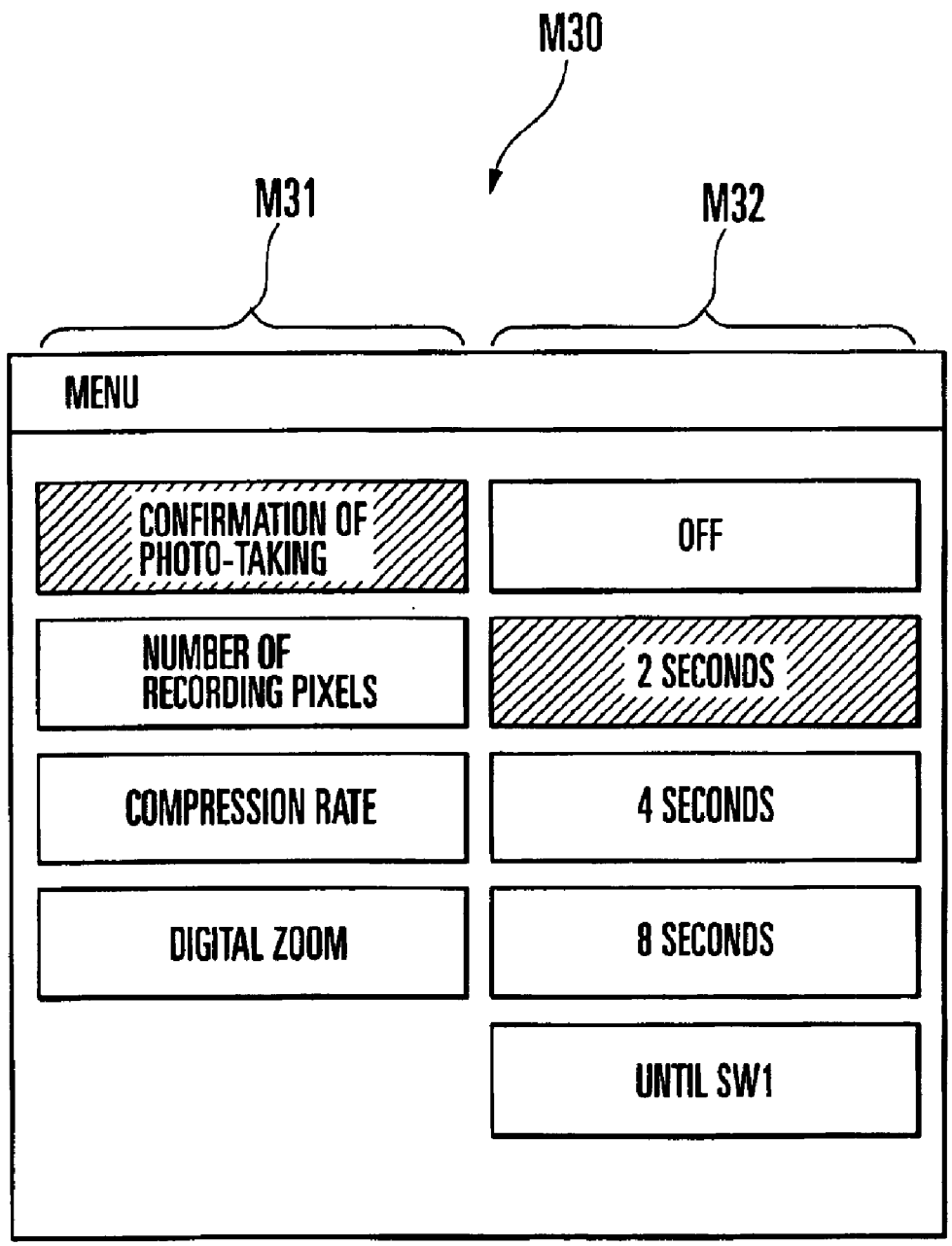
FIG. 3 is a diagram showing an example of a menu setting picture display at the time of a photo-taking operation according to another embodiment of the invention.

FIG. 3 is a diagram showing an example of a menu setting picture display at the time of a photo-taking operation according to another embodiment of the invention.

Referring to FIG. 3, a menu M30 is displayed at the display part 54 in response to the depression of the menu button of the operation button 70. In the menu M30, first, a selection item section M31 is displayed at the left column portion as viewed in FIG. 3. The selection item section M31 includes items "confirmation of phototaking", "number of recording pixels", "compression rate" and "digital zoom". The user selects a desired item by operating the up switch or the down switch of the operation part 70, and decides the item by depressing the setting switch. Then, in the menu M30, a pull-down menu M32 corresponding to the item as decided is displayed at the right column portion as viewed in FIG. 3.

For example, if the item "confirmation of phototaking" is selected and decided in the selection item section M31, setting items "off", "2 seconds", "until SW1", etc., as shown in FIG. 3 are displayed in the pull-down menu M32. The user selects and decides a desired item, in the manner similar to the above operation, by using the up switch or the down switch and the setting switch of the operation part 70.

In the case of the item "off" in the pull-down menu M32, the confirmation display starting trigger does not occur. In the cases of the items "2 seconds", "4 seconds" and "8 seconds", the confirmation display starting trigger always occurs, and the confirmation display ending trigger occurs 2 seconds, 4 seconds and 8 seconds after the start of the confirmation display, respectively. In the case of the item "until SW1", the confirmation display starting trigger always occurs, and the confirmation display ending trigger occurs when the shutter switch (SW1) 62 has been depressed. The confirmation display keeping trigger is made to always occur when the confirmation display starting trigger has occurred. Accordingly, during the process of the confirmation display, it is possible to perform the various processing operations, such as the protection process. Incidentally, an item for defining the timing of occurrence of the confirmation display keeping trigger may be provided in the pull-down menu M32, so that the occurrence of the confirmation display keeping trigger can be individually selected and decided.

More particularly, in the confirmation display processing operation shown in FIG. 2, the following procedure is effected. If the item "off" is selected with respect to the item "confirmation of photo-taking", the procedure always shifts from the step S201 shown in FIG. 2 immediately to the photo-taking preparing state (step S219) without performing the confirmation display. If the item "2 seconds" is selected, a timer is set after the confirmation display starting process (step 202), and after 2 seconds, the confirmation display ending trigger occurs. Then, the confirmation display is brought to an end at the step S205 after the occurrence of the confirmation display ending trigger. If the item "until SW1" is selected, the confirmation display continues, and the confirmation display is brought to an end at the step S205 after the occurrence of the confirmation display ending trigger due to the depression of the shutter switch (SW1) 62.

As described with reference to FIG. 3, since the occurrence of the confirmation display starting trigger, etc., is beforehand set statically, it is possible to perform the confirmation display agreeable to the usage manner of the user, thereby improving the operability of the image processing apparatus. Incidentally, the respective triggers may be made to occur by the methods other than those mentioned in the foregoing.

Further, it goes without saying that the aimed object of the invention can be achieved by supplying a computer program product, such as a storage medium, in which program codes of software for implementing the function of each the above-described embodiments is stored, to an image processing apparatus, and by reading and executing the program codes stored in the storage medium with a computer (or a CPU or an MPU) in the image processing apparatus.

In this case, the program codes themselves which are read out from the computer program product, such as a storage medium, implement the novel function of the invention, and the storage medium which stores therein the program codes constitutes the invention.

As a storage medium for supplying the program codes, for example, an arbitrary storage medium can be used such as a floppy disk, a hard-disk, an optical disk, a magneto-optical disk, a CD-ROM, a CD-R, a magnetic tape, a non-volatile memory card, a ROM, etc.

Furthermore, while the function of each of the above-described embodiments is implemented by executing the program codes read by the computer, it goes without saying that the function of each of the above-described embodiments can be achieved also when an operating system (OS) running on the computer performs a part of or all of the actual processes on the basis of instructions of the program codes.

Moreover, it goes without saying that the function of each of the above-described embodiments can be realized in such a manner that, after program codes which are read out from a computer program product, such as a storage medium, are written into a memory provided in a function extension board inserted into a computer or a function extension unit connected to a computer, a CPU or the like provided in the function extension board or the function extension unit performs a part of or all of the actual processes on the basis of instructions from the program codes.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, the software arrangement and the hardware arrangement in each of the above-mentioned embodiments may be adaptively replaced with each other.

Further, in the invention, the above-described embodiments or the technical elements of the above-described embodiments may be combined with each other according to necessity.

Further, the invention also applies to cases where each claim or the whole or a part of the arrangement of each embodiment constitutes one apparatus or is used in combination with another apparatus or as a component element of an apparatus.

Further, the invention is also applicable to various types of cameras, such as electronic cameras for picking up a moving image or a still image, cameras using a silver-halide film, single-lens reflex cameras, lens-shutter cameras and surveillance cameras, various image pickup apparatuses other than cameras, various image reading apparatuses, various optical apparatuses, and other types of apparatuses, and, moreover, to apparatuses adapted for the cameras, the image pickup apparatuses, the image reading apparatuses, the optical apparatuses and the other types of apparatuses, elements constituting the above-mentioned apparatuses, a control method adapted for the above-mentioned apparatuses, and a computer program product supplying a control program for executing the control method.

What is claimed is:

1. An image pickup apparatus, comprising:
   (A) a display device which displays a current photo-taken image obtained by a photo-taking operation in response to the photo-taking operation, said display device keeping displaying of the current photo-taken image; and
   (B) a processing device which, in a state where displaying of the current photo-taken image is kept by said display device, applies a predetermined processing operation to the current photo-taken image the displaying of which is kept.

2. An image pickup apparatus according to claim 1, wherein said processing device applies the processing operation which is selected by a user among the plurality of predetermined processing operations to the current photo-taken image the displaying of which is kept, by an operation of an external operation member.

3. An image pickup apparatus according to claim 1, wherein said image pickup apparatus includes a camera.

4. An image pickup apparatus according to claim 2, wherein said predetermined processing operation is to apply a protection process to the current photo-taken image the displaying of which is kept.

5. An image pickup apparatus according to claim 2, wherein said predetermined processing operation is to apply an enlargement process to the current photo-taken image the displaying of which is kept.

6. An image pickup apparatus according to claim 2 wherein said predetermined processing operation is to apply a rotation process to the current photo-taken image the displaying of which is kept.

7. An image pickup apparatus according to claim 2, wherein said predetermined processing operation is to apply a print designating process to the current photo-taken image the displaying of which is kept.

8. An image pickup apparatus according to claim 2, wherein said predetermined processing operation is to display information about the photo-taking condition together with the current photo-taken image the displaying of which is kept.

9. An image pickup apparatus according to claim 2, wherein said predetermined processing operation is to erase the current photo-taken image the displaying of which is kept.

10. A control method adapted for an image pickup apparatus, comprising:
    displaying a current photo-taken image obtained by a photo-taking operation in response to the photo-taking operation, keeping displaying of the current photo-taken image, and, in a state where displaying of the current photo-taken image is kept, applying a predetermined processing operation to the current photo-taken image the displaying of which is kept.

11. A control method according to claim 10, wherein said predetermined processing operation is to apply a protection process to the current photo-taken image the displaying of which is kept.

12. A control method according to claim 10, wherein said predetermined processing operation is to apply an enlargement process to the current photo-taken image the displaying of which is kept.

13. A control method according to claim 10, wherein said predetermined processing operation is to apply a rotation process to the current photo-taken image the displaying of which is kept.

14. A control method according to claim 10, wherein said predetermined processing operation is to apply a print designating process to the current photo-taken image the displaying of which is kept.

15. A control method according to claim 10, wherein said predetermined processing operation is to display information about the photo-taking condition together with the current photo-taken image the displaying of which is kept.

16. A control method according to claim 10, wherein said predetermined processing operation is to erase the current photo-taken image the displaying of which is kept.

17. A computer-readable medium storing a computer-readable program adapted for an image pickup apparatus, comprising contents of:
    displaying a current photo-taken image obtained by a photo-taking operation in response to the photo-taking operation, keeping displaying of the current photo-taken image, and, in a state where displaying of the current photo-taken image is kept, applying a predetermined processing operation to the current photo-taken image the displaying of which is kept.

18. A computer-readable medium storing a computer-readable program according to claim 17, wherein said predetermined processing operation is to apply a protection process to the current photo-taken image the displaying of which is kept.

19. A computer-readable medium storing a computer-readable program according to claim 17, wherein said predetermined processing operation is to apply an enlargement process to the current photo-taken image the displaying of which is kept.

20. A computer-readable medium storing a computer-readable program according to claim 17, wherein said predetermined processing operation is to apply a rotation process to the current photo-taken image the displaying of which is kept.

21. A computer-readable medium storing a computer-readable program according to claim 17, wherein said predetermined processing operation is to apply a print designating process to the current photo-taken image the displaying of which is kept.

22. A computer-readable medium storing a computer-readable program according to claim 17, wherein said predetermined processing operation is to display information about the photo-taking condition together with the current photo-taken image the displaying of which is kept.

23. A computer-readable medium storing a computer-readable program according to claim 17, wherein said predetermined processing operation is to erase the current photo-taken image the displaying of which is kept.

24. An image picking apparatus, comprising: (A) a display device which displays a current photo-taken image obtained by photo-taking operation in response to the photo-taking operation, said display device keeping displaying of the current photo-taken image which is stored in an internal memory; and (B) a processing device which, in a state where displaying of the current photo-taken image is kept by said display device, applies a predetermined processing operation to the current photo-taken image the displaying of which is kept.

25. An image pickup apparatus according to claim 24, wherein said processing device applies the predetermined processing operation to the current photo-taken image the displaying of which is kept, by an operation of an external operation member.

26. An image pickup apparatus according to claim 24, wherein said predetermined processing operation is to apply a protection process to the current photo-taken image the displaying of which is kept.

27. An image pickup apparatus according to claim 24, wherein said predetermined processing operation is to apply an enlargement process to the current photo-taken image the displaying of which is kept.

28. An image pickup apparatus according to claim 24, wherein said predetermined processing operation is to apply a rotation process to the current photo-taken image the displaying of which is kept.

29. An image pickup apparatus according to claim 24, wherein said predetermined processing operation is to apply a print designating process to the current photo-taken image the displaying of which is kept.

30. An image pickup apparatus, comprising: (A) a display device which displays a current photo-taken image obtained by a photo-taking operation in response to the photo-taking operation, said display device keeping displaying of the current photo-taken image; and (B) a processing device which, in a state where displaying of the current photo-taken image is kept by said display device, applies a predetermined processing operation which changes a first displaying state to a second displaying state to the current photo-taken image the displaying of which is kept.

31. An image pickup apparatus according to claim 30, wherein said predetermined processing operation is to apply an enlargement process to the current photo-taken image the displaying of which is kept.

32. An image pickup apparatus according to claim 30, wherein said predetermined processing operation is to apply a rotation process to the current photo-taken image the displaying of which is kept.

* * * * *

UNITED STATES PATENT AND TRADEMARK OFFICE
CERTIFICATE OF CORRECTION

PATENT NO. : 6,937,281 B1
APPLICATION NO. : 09/685175
DATED : August 30, 2005
INVENTOR(S) : Yasuyuki Ogawa It is certified that error appears in the above-identified patent and that said Letters Patent is hereby corrected as shown below:

Title (54) delete " PROGRAM PROCDUCT" and insert
-- PROGRAM PRODUCT--

Column 15, line 28, delete "applies a predetermined processing operation" and insert
-- applies a processing operation which is selected by a user among a plurality of predetermined processing operations --.

Column 15, line 40, delete "predetermined processing operation" and insert
-- processing operation which is selected by a user among said plurality of predetermined processing operations --.

Column 15, line 44, delete "predetermined processing operation" and insert
-- processing operation which is selected by a user among said plurality of predetermined processing operations --.

Column 15, line 48, delete "predetermined processing operation" and insert
-- processing operation which is selected by a user among said plurality of predetermined processing operations --.

Column 15, line 52, delete "predetermined processing operation" and insert
-- processing operation which is selected by a user among said plurality of predetermined processing operations --.

Signed and Sealed this

Eighth Day of August, 2006

JON W. DUDAS
*Director of the United States Patent and Trademark Office*